(12) United States Patent
Zhan et al.

(10) Patent No.: US 8,561,964 B2
(45) Date of Patent: Oct. 22, 2013

(54) ELECTRIC CONTROL VALVE AND VALVE BODY DEVICE THEREOF

(75) Inventors: Caiyi Zhan, Zhejiang Province (CN); Ze Yuan, Zhejiang Province (CN); Xianrang Wei, Zhejiang Province (CN)

(73) Assignee: Zheijiang Sanhua Co., Ltd., Xinchang County, Zhejiang Province (CN)

( * ) Notice: Subject to any disclaimer, the term of this patent is extended or adjusted under 35 U.S.C. 154(b) by 306 days.

(21) Appl. No.: 12/834,100

(22) Filed: Jul. 12, 2010

(65) Prior Publication Data

US 2011/0012039 A1    Jan. 20, 2011

(30) Foreign Application Priority Data

Jul. 15, 2009   (CN) .......................... 2009 1 0140310
Feb. 11, 2010   (CN) .......................... 2010 1 0111743

(51) Int. Cl.
  *F16K 31/02*   (2006.01)
(52) U.S. Cl.
  USPC ..................................... 251/129.15; 335/299
(58) Field of Classification Search
  USPC ....................... 335/299, 297, 296; 251/129.15
  See application file for complete search history.

(56) References Cited

U.S. PATENT DOCUMENTS

| | | | | |
|---|---|---|---|---|
| 3,062,992 | A * | 11/1962 | Dahl et al. | 335/299 |
| 3,321,946 | A * | 5/1967 | Ferguson | 72/56 |
| 4,578,662 | A * | 3/1986 | Slavin et al. | 335/262 |
| 4,842,010 | A * | 6/1989 | Edgecomb et al. | 137/343 |
| 5,121,093 | A * | 6/1992 | Matsushita | 335/296 |
| 5,251,659 | A * | 10/1993 | Sturman et al. | 137/339 |
| 6,397,891 | B1 * | 6/2002 | Neuhaus et al. | 137/625.65 |
| 7,686,038 | B2 | 3/2010 | Chavanne | |
| 8,006,718 | B2 * | 8/2011 | Hamaoka et al. | 137/625.65 |
| 2004/0011982 | A1 * | 1/2004 | Hirata et al. | 251/129.15 |
| 2004/0206923 | A1 | 10/2004 | Uryu et al. | |
| 2006/0278838 | A1 * | 12/2006 | Chavanne | 251/129.15 |
| 2010/0044608 | A1 * | 2/2010 | Ogawa | 251/129.15 |

FOREIGN PATENT DOCUMENTS

| | | |
|---|---|---|
| CN | 1880811 | 12/2006 |
| DE | 102005049122 A1 | 10/2006 |
| JP | 2006349172 A | 12/2006 |

OTHER PUBLICATIONS

European Search Report for Application No. 101685790.0 dated Oct. 26, 2010.

* cited by examiner

*Primary Examiner* — John K Fristoe, Jr.
*Assistant Examiner* — Umashankar Venkatesan
(74) *Attorney, Agent, or Firm* — Wolf, Greenfield & Sacks, P.C.

(57) ABSTRACT

The present invention discloses a valve body device for an electric control valve comprising a valve seat (21) and a fixing frame (22) connected with the valve seat (21), wherein, the valve seat (21) is provided on its outer wall with a first positioning groove (211) extending circumferentially, and the direction towards which the first positioning groove (211) opens is perpendicular to the axial direction of the valve seat (21), and wherein, the fixing frame (22) is provided with a positioning flat plate portion (221) fitted with the first positioning groove (211), and the positioning flat plate portion (221) is inserted into the first positioning groove (211) and fixedly connected with the valve seat (21). The fixing frame of the valve body device may be mounted on the valve seat after the valve seat and the cap is welded, which may prevent the fixing frame from being damaged, and may allow the fixing frame and the valve seat to be positioned accurately with each other and thus to be welded in a convenient and reliable way. The present invention also discloses an electric control valve including the above described valve body device.

12 Claims, 9 Drawing Sheets they are symmetrically distributed at two ends of the positioning flat plate portion. When there are three fixing platforms, one of them is coplanar with the positioning flat plate portion and provided with a second positioning groove, and the other two are symmetrically distributed at both sides of the positioning flat plate portion.

ELECTRIC CONTROL VALVE AND VALVE BODY DEVICE THEREOF

FIELD OF THE INVENTION

The present invention relates to the field of electric control valve technique for a refrigerating system, in particular to a valve body device. The present invention also relates to an electric control valve including the valve body device.

BACKGROUND

An electric control valve for a refrigerating system generally includes a valve body device and an electromagnetic coil device connected with the valve body device. The valve body device includes a fixing frame, and the electromagnetic coil device includes a snap fitting. The fixing frame is fitted with the fixing frame so as to achieve mutual positioning between the valve body device and the electromagnetic coil device.

In operation, the electric control valve drives a valve core of the valve body device to move through a magnet field generated by energizing the electromagnetic coil device, so as to control the opening action of the valve port.

Referring to FIG. 1, wherein a structural schematic view of a typical valve body device in the prior art is shown.

The valve body device in the prior art includes a valve seat 11, a body housing 13, a copper tube 14, a cap and a fixing frame 12 welded together with the valve seat. Through being welded with the cap, the valve seat 11 is connected with the body housing 13.

The fixing frame 12 is a flat plate opened at the center, and thus must be assembled together with the valve seat 11, the body housing 13, the copper pipe 14 and the cap, before the valve seat 11 and the cap can be welded together, and then the fixing frame 12 and the valve seat 11 are welded together. Generally, the welding type used between the valve seat 11 and the cap is high temperature brazing. When the valve seat 11 is welded with the cap, since the fixing frame 12 is very close to the welding point, the high brazing temperature will soften the material of the fixing frame, such that the strength of the material of the fixing frame 12 is decreased. Therefore, during the practical use, the fixing frame 12 is extremely apt to bend and deform, and will also get rusty to some extent.

Meanwhile, the distances between the fixing frame 12 and the valve seat 11 as well as the cap are very small, which will interfere with the welding between the valve seat 11 and the cap. Therefore, the percent of pass of the brazing for the valve seat 11 is decreased.

Further, in the prior art, the welding type used between the fixing frame 12 and the valve seat 11 is also high temperature brazing. Obviously, this high brazing temperature will also soften the material of the fixing frame 12, such that the strength of the material of the fixing frame 12 is decreased and thus the fixing frame 12 is caused to bend, deform and get rusty.

SUMMARY OF THE INVENTION

One technical problem to be solved by the present invention is to provide a valve body device, which can, during welding the valve seat with the cap, prevent damage to the fixing frame, and can allow the fixing frame and the valve seat to be positioned accurately with each other and thus to be welded in a convenient and reliable way. Another technical problem to be solved by the present invention is to provide an electric control valve including the above described valve body device.

To solve the above described technical problem, the present invention provides a valve body device for an electric control valve comprising a valve seat and a fixing frame connected with the valve seat, wherein, the valve seat is provided on its outer wall with a first positioning groove extending circumferentially, and the direction towards which the first positioning groove opens is perpendicular to the axial direction of the valve seat, and wherein, the fixing frame is provided with a positioning flat plate portion fitted with the first positioning groove, and the positioning flat plate portion is inserted into the first positioning groove and fixedly connected with the valve seat.

Preferably, the first positioning groove extends over at least half of the circumference, and the positioning flat plate portion has a substantially C shape.

Preferably, the fixing frame further comprises a fixing flat plate portion connected with the positioning flat plate portion, and the fixing flat plate portion supports an electromagnetic coil device of the electric control valve.

Preferably, the fixing frame further comprises an arc-shaped connecting portion by which the positioning flat plate portion is connected with the fixing flat plate portion.

Preferably, the fixing flat plate portion is provided with a second positioning groove for fitting with a positioning projecting portion of a snap fitting of the electromagnetic coil device.

Preferably, the fixing flat plate portion comprises at least one fixing platform, each of the fixing platforms has a top surface parallel to the top surface of the positioning flat plate portion and located in the same plane, and at least one of the respective fixing platforms is provided with the second positioning groove.

Preferably, the number of the fixing platform is at least two, and the respective fixing platforms has a distribution range larger than 180° in a plane perpendicular to an axis of the valve seat.

Preferably, the number of the fixing platform is three, the three fixing platforms are a first fixing platform, a second fixing platform and a third fixing platform, respectively; a middle plane of the first fixing platform is coplanar with a middle plane of the positioning flat plate portion, and one second positioning groove is provided at the first fixing platform; the second fixing platform and the third fixing platform are respectively disposed at two ends of the positioning flat plate portion and are symmetrically distributed at both sides of the middle plane of the positioning flat plate portion.

Preferably, the number of the fixing platform is two, the two fixing platforms are a fourth fixing platform and a fifth fixing platform, respectively; the fourth fixing platform and the fifth fixing platform are respectively disposed at two ends of the positioning flat plate portion and are symmetrically distributed at both sides of a middle plane of the positioning flat plate portion.

Preferably, a first connecting portion and a second connecting portion respectively project out of two ends of the positioning flat plate portion along a tangential direction of an opening therebetween and are riveted into the first positioning groove.

Preferably, an inner edge of the positioning flat plate portion is provided with a projecting portion, and a bottom portion of the first positioning groove is provided with a recessed portion that is fitted with the projecting portion.

Preferably, a fixed connection between the positioning flat plate portion and the valve seat is made through laser welding or argon welding.

Preferably, welding points between the positioning flat plate portion and the valve seat are located at a bottom wall of the positioning flat plate portion.

To solve the above described technical problem, the present invention further provide an electric control valve including the valve body device as described above.

Preferably, an electromagnetic coil device of the electric control valve comprises a coil body, the coil body is provided with a wiring terminal portion projecting out of a circumferential side surface thereof; and the electromagnetic coil device further comprises a snap fitting, the snap fitting has an inserting flat plate portion which is pottingly connected with the wiring terminal portion through potting material.

Preferably, the wiring terminal portion is further provided with a third positioning groove into which the inserting flat plate portion is pottingly connected through the potting material.

As compared with the prior art, a valve body device for an electric control valve provided by the present invention includes a valve seat and a fixing frame connected with the valve seat, wherein, the valve seat is provided on its outer wall with a first positioning groove extending circumferentially, and the direction towards which the first positioning groove opens is perpendicular to the axial direction of the valve seat, and wherein, the fixing frame is provided with a positioning flat plate portion fitted with the first positioning groove, and the positioning flat plate portion is inserted into the first positioning groove and fixedly connected with the valve seat.

The valve seat has the first positioning groove on the outer wall thereof and the positioning flat plate portion of the fixing frame is inserted into the first positioning groove, thereby the positioning between the valve seat and the fixing frame is achieved. In such structural design, it is not necessary for the fixing frame to be assembled together with the valve seat, the body housing, the copper tube and the cap beforehand. Instead, the assembling and welding between the fixing frame and the valve seat are performed after the valve seat is connected with the body housing through being welded with the cap.

Generally, the welding type used between the valve seat and the cap is high temperature brazing. When the valve seat and the cap are being welded, the fixing frame is not yet assembled with the valve seat. Therefore, the fixing frame is not affected by the high brazing temperature, and is thus prevented from being damaged by the high temperature brazing.

Only after the welding of the valve seat with the cap is finished, the welding between the fixing frame and the valve seat is performed. Here, through the fitting between the positioning flat plate portion of the fixing frame and the first positioning groove of the valve seat, the positioning between the fixing frame and the valve seat is made. Then, the fixing frame is welded to the valve seat. This allows the mutual positioning between the fixing frame and the valve seat to be accurate, and thus allows the welding to be convenient, and also improves the welding quality.

To sum up from the above description, the valve body device provided by the present invention can, during welding the valve seat with the cap, prevent damage to the fixing frame, and can allow the fixing frame and the valve seat to be positioned accurately with each other and thus to be welded in a convenient and reliable way.

DETAILED DESCRIPTION OF THE INVENTION

One core of the present invention is to provide a valve body device, which can prevent damage to the fixing frame during welding the valve seat with the cap, and allow the fixing frame and the valve seat to be positioned accurately with each other and thus to be welded in a convenient and reliable way. Another core of the present invention is to provide an electric control valve including the above described valve body device.

For better understanding the technical solution of the present invention by persons skilled in the art, the present invention is explained in further detail below in conjunction with the Drawings and the specific embodiments.

Figure 1:
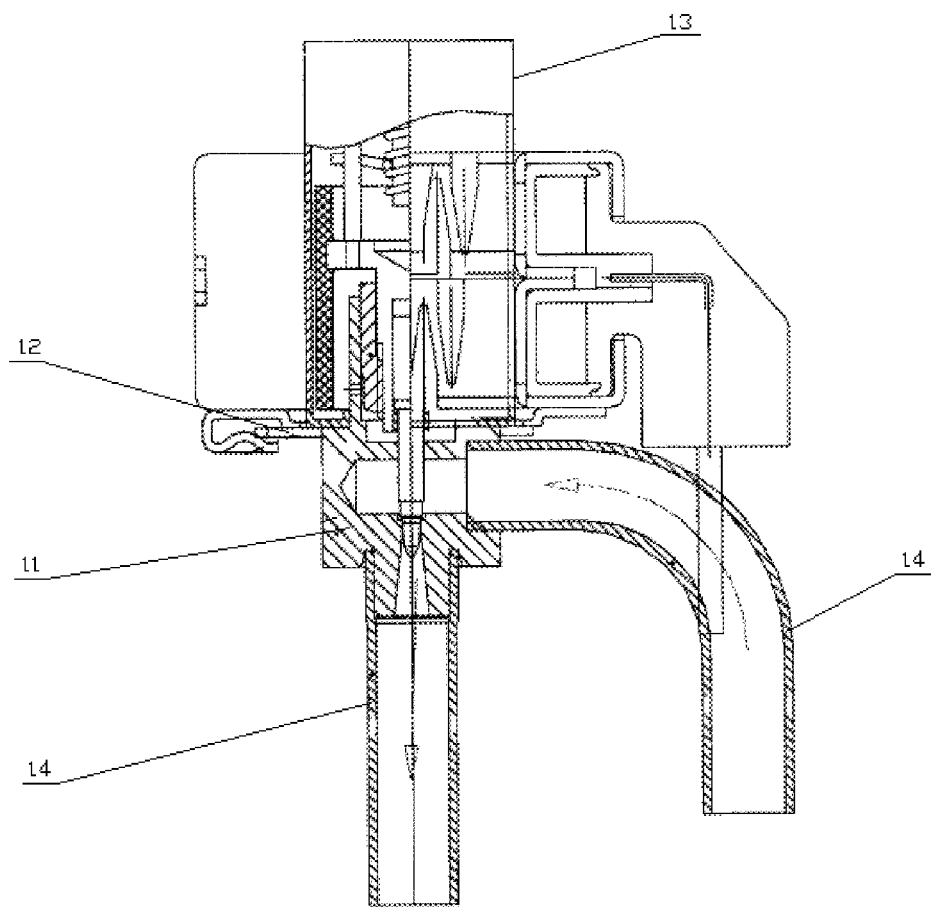
FIG. 1 is a structural schematic view of a typical valve body device in the prior art.
Figure 2:
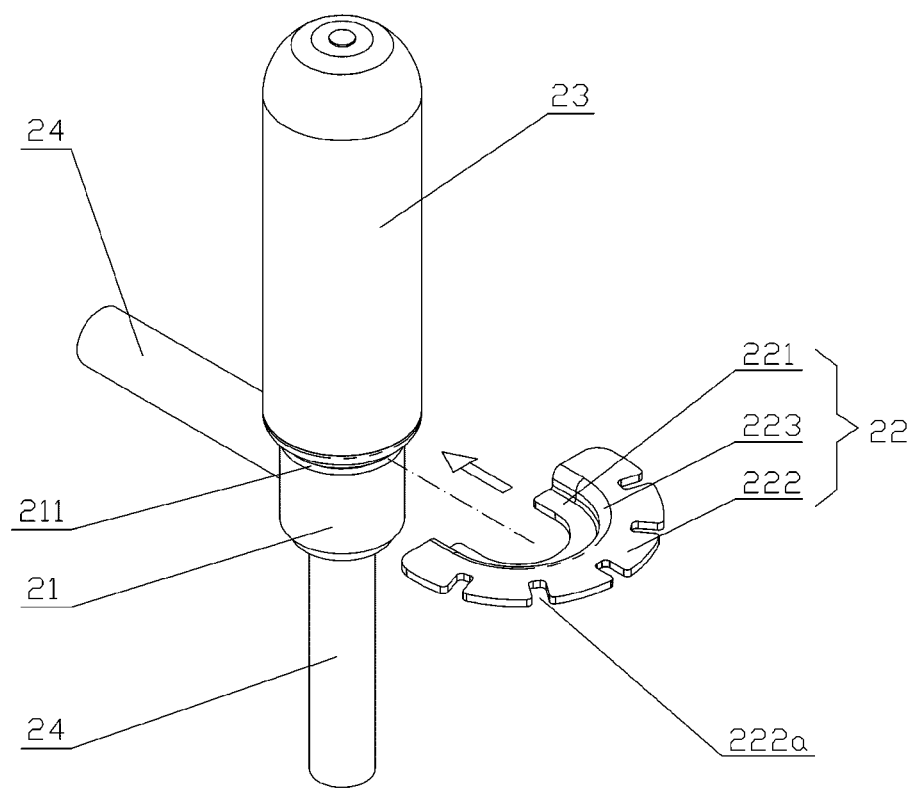
FIG. 2 is a structural schematic view of the valve body device in an embodiment of the present invention in a state where the fixing frame and the valve seat is separated.
Figure 3:
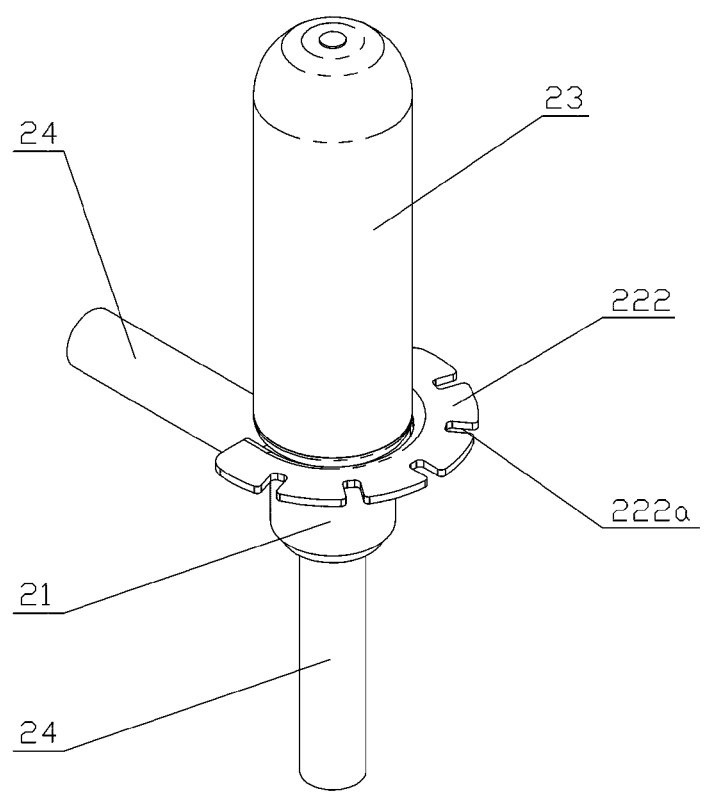
FIG. 3 is a structural schematic view of the valve body device in an embodiment of the present invention in a state where the fixing frame and the valve seat is mounted.

Referring to FIGS. 2 and 3, wherein FIG. 2 is a structural schematic view of the valve body device in an embodiment of the present invention in a state where the fixing frame and the valve seat are separated, and FIG. 3 is a structural schematic view of the valve body device in an embodiment of the present invention in a state where the fixing frame and the valve seat are mounted.

In the first embodiment, the valve body device for the electric control valve provided by the present invention includes a valve seat 21 and a fixing frame 22, which are connected together. The fixing frame 22 is provided with a positioning flat plate portion 221, the valve seat 21 is provided on its outer wall with a first positioning groove 211 extending circumferentially, and the direction towards which the first positioning groove opens is perpendicular to the axial direction of the valve seat 21. The positioning flat plate portion 221 is fitted with the first positioning groove 211, and the positioning flat plate portion 221 is inserted into the first positioning groove 211 and fixedly connected with the valve seat 21.

In such structural design, the valve seat 21, a body housing 23, a copper tube 24 and a cap are assembled firstly. After that, the positioning flat plate portion 221 is then inserted into the first positioning groove 211. Therefore, the positioning between the fixing frame 22 and valve seat 21 is achieved.

Then, the fixed connection between the fixing frame 22 and the valve seat 21 is implemented by way of welding or the like. Certainly, the form of fixed connection described above is not limited to welding, and other forms of fixed connection may also be used.

Generally, the welding type used between the valve seat 21 and the cap is high temperature brazing. When the valve seat 21 and the cap are being welded, the fixing frame 22 is not yet assembled with the valve seat 21. Therefore, the fixing frame 22 is not affected by the high brazing temperature, and is thus prevented from being damaged by the high temperature brazing.

Meanwhile, inserting the positioning flat plate portion 221 into the first positioning groove 211 may allow a more accurate positioning between the fixing frame 22 and the valve seat 21. The fixing frame 22 is then welded onto the valve seat 21, thereby the welding quality is improved and the welding becomes convenient.

The valve body device provided by the present invention can, during welding the valve seat 21 with the cap, prevent damage to the fixing frame 22, and can allow the fixing frame 22 and the valve seat 21 to be positioned accurately with each other and thus to be welded in a convenient and reliable way.

Referring to FIG. 2, the second embodiment of the present invention is a further improvement made on the basis of the first embodiment described above.

Specifically, the first positioning groove 211 extends for at least half of the circumference, and the positioning flat plate portion 221 has a substantially C shape. Certainly, the first positioning groove 211 may be a circular ring-shaped groove. The positioning flat plate portion 221 has a substantially C shape, which allows for a close fit of the positioning flat plate portion 221 with the first positioning groove 211. Therefore, the positioning accuracy may be improved, and then the quality of the welding between the positioning flat plate portion 221 and the valve seat 21 may be improved.

Figure 4:
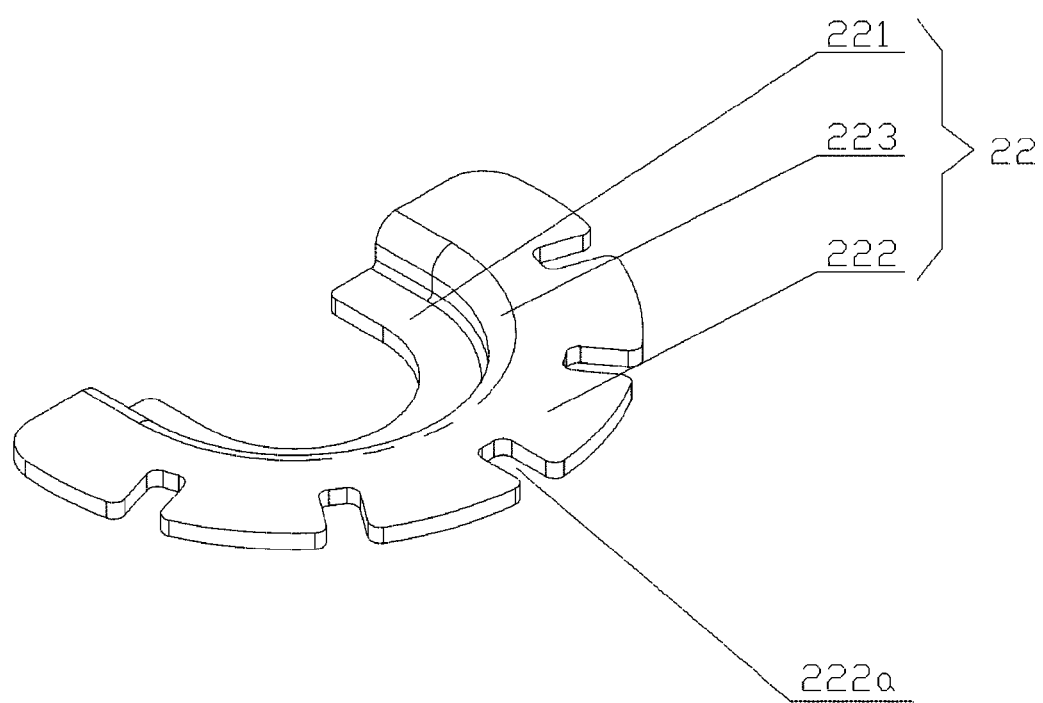
FIG. 4 is a structural schematic view of the fixing frame of the valve body device in an embodiment of the present invention.
Figure 5:
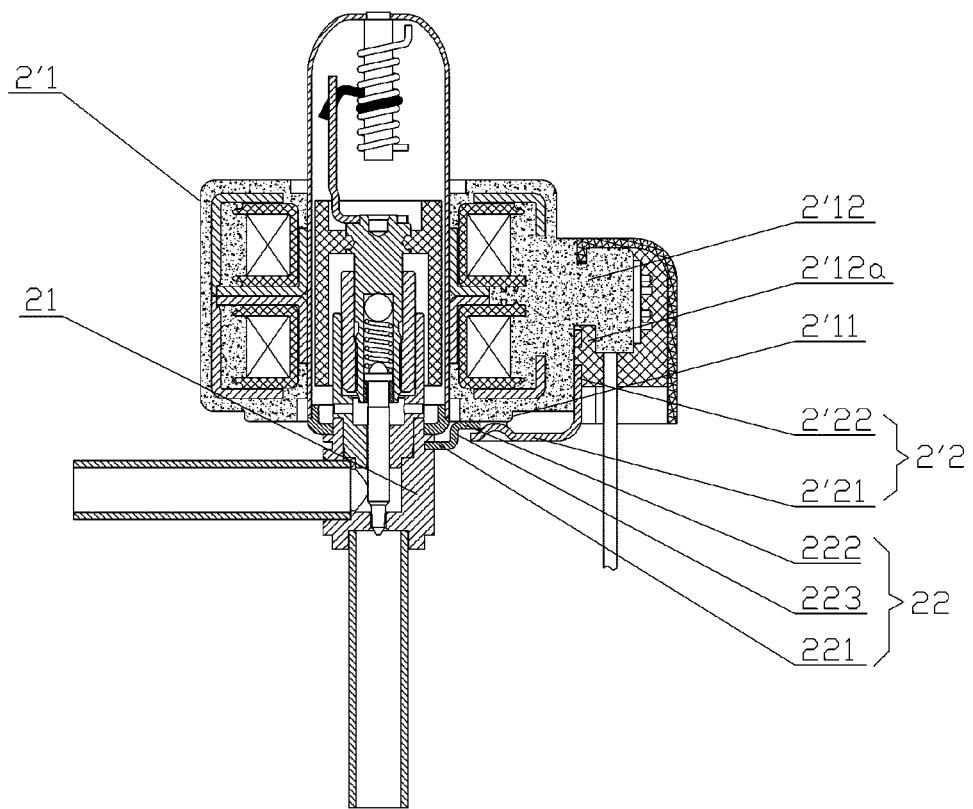
FIG. 5 is a structural schematic view of the electric control valve in an embodiment of the present invention.

Referring to FIGS. 4 and 5, wherein FIG. 4 is a structural schematic view of the fixing frame of the valve body device in an embodiment of the present invention, and FIG. 5 is a structural schematic view of the electric control valve in an embodiment of the present invention.

The third embodiment of the present invention is a further improvement made on the basis of the second embodiment described above.

In the third embodiment, as shown in FIG. 4, the fixing frame 22 further includes a fixing flat plate portion 222, which is connected with the positioning flat plate portion 221 and supports an electromagnetic coil device of the electric control valve. As shown in FIG. 5, the electromagnetic coil device may be further provided with a positioning boss 2'11. Specifically, the fixing flat plate portion 222 and the positioning boss 2'11 are engaged with each other to support the electromagnetic coil device. Such form is simple and convenient, easy to operate and has a lower cost.

The fourth embodiment of the present invention is a further improvement made on the basis of the third embodiment described above.

In the fourth embodiment, the fixing frame 22 further includes an arc-shaped connecting portion 223, which is connected with the positioning flat plate portion 221 as well as with the fixing flat plate portion 222, so as to achieve the connection between the positioning flat plate portion 221 and the fixing flat plate portion 222.

The arc-shaped connecting portion 223 has an appropriate height in the vertical direction. The height of the arc-shaped connecting portion 223 can be adjusted during the product design, and thus the relative position in the axial direction between the valve body device and the electromagnetic coil device is adjusted, such that the position between a coil and a magnet is optimized, so as to obtain the greatest driving moment.

Further improvements may also be made on the basis of the four embodiment described above. As shown in FIG. 4, the fixing flat plate portion 222 may be further provided with a second positioning groove 222a for fitting with a positioning projecting portion of a snap fitting 2'2 of the electromagnetic coil device.

As shown in FIG. 5, the positioning projecting portion is caught into the second positioning groove 222a, such that the relative position in the circumferential direction between the valve body device and the electromagnetic coil device is fixed while the relative position in the vertical direction therebetween is fixed. Therefore, the mutual positioning between the both is achieved.

Figure 7:
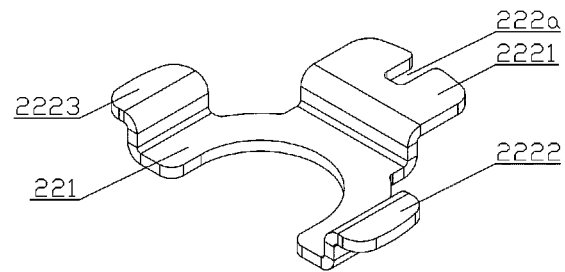
FIG. 7 is a structural schematic view of the fixing frame of the valve body device in another embodiment of the present invention.
Figure 8:
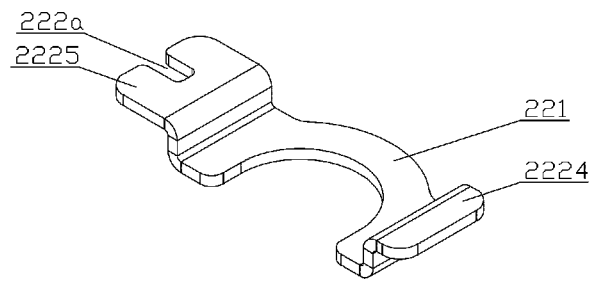
FIG. 8 is a structural schematic view of the fixing frame of the valve body device in still another embodiment of the present invention.

Referring to FIGS. 7 and 8, wherein FIG. 7 is a structural schematic view of the fixing frame of the valve body device in another embodiment of the present invention, and FIG. 8 is a structural schematic view of the fixing frame of the valve body device in still another embodiment of the present invention.

In the embodiment provided with the second positioning groove 222a as described above, the fixing flat plate portion 222 is a structure continuously distributed in the circumferential direction, such structure is difficult to manufacture and results in a high manufacturing cost. In view of this, further improvements may be made for it in order to reduce the difficulty in the manufacture of the fixing flat plate portion 222 and thus reduce the manufacturing cost. Specifically, as shown in FIGS. 7 and 8, the fixing flat plate portion 222 includes at least one fixing platform. Each fixing platform has a top surface parallel to the top surface of the positioning flat plate portion 221 and located in the same plane. At least one of the respective fixing platforms is provided with the second positioning groove 222a. Obviously, in this embodiment, the fixing platform can be relatively easily processed through a simple bending technology, and the injection-molded positioning boss 2'11 (shown in FIG. 10) of the coil body 2'1 (shown in FIG. 10) is supported by the plane formed by the top surfaces of the respective fixing platforms in order to axially position the coil body 2'1. In addition, the plane formed by the top surfaces of the respective fixing platforms is parallel to the top surface of the positioning flat plate portion 221 and has an axial spacing from the latter, and the relative position of the fixing frame 22 and the magnet can be adjusted through this spacing.

The processing technology of the fixing frame 22 of the fixing flat plate portion 222 continuously distributed in the circumferential direction as shown in FIG. 4 is as follows: firstly forming the arc-shaped connecting portion 223 in a substantially circular plate through a complicated stretching technology such that the plate becomes a shallow barrel shape and a substantially elongated circle shape; then, cutting the elongated circle plate along the shorter radius and splitting it into two fixing frames 22 without the second positioning groove 222a; After that, forming the second positioning groove 222a in the fixing frame 22. In this processing technology, the stretching technology is relatively complicated and time consuming. Therefore, the fixing frame 22 is not easy to manufacture and the manufacturing cost is relatively high. In the present invention, however, the fixing flat plate portion 222 is divided into fixing platforms unconnected with each other, and the plurality of fixing platforms can be formed by firstly forming the arc-shaped connecting portion 223 through a first bending (it should be noted that accordingly the arc-shaped connecting portion 223 is also not continuously distributed in the present invention) and then performing a second outward bending on the basis of the plate of the arc-shaped connecting portion 223. Obviously, the manufacturing difficulty is reduced, the manufacturing efficiency is improved and the manufacturing cost is decreased.

Obviously, there is another advantage in the above embodiment. That is, compared with the fixing flat plate portion 222 continuously distributed in the circumferential direction, the fixing flat plate portion 222 defined by the fixing platform structure as described above allows for a saving in the material and thus a further reduction in the material cost.

In the above embodiment, the number of the fixing platform may be one, but not limited to this. To further improve the stability at which the fixing platform supports the coil, the number of the fixing platform may be at least two, and the respective fixing platforms have a distribution range larger than 180° in a plane perpendicular to an axis of the valve seat 21 (shown in FIG. 10).

Certainly, further arrangements may be made in the number and position of the fixing platform. Specifically, as shown in FIG. 7, the number of the fixing platform is three, and the three fixing platforms are a first fixing platform 2221, a second fixing platform 2222 and a third fixing platform 2223, respectively. A middle plane of the first fixing platform 2221 is coplanar with a middle plane of the positioning flat plat portion 221, and one second positioning groove 222a is provided at the first fixing platform 2221. To further enlarge the distribution range of the fixing platform, the second fixing platform 2222 and the third fixing platform 2223 may be respectively disposed at two ends of the positioning flat plate portion 221, and are symmetrically distributed at both sides of the middle plane of the positioning flat plate portion 221. It should be stated here that, in this specification, the middle plane of the positioning flat plate 221 refers to a middle plane that is perpendicular to the top surface of the positioning flat plate 221, passes through the centre of a substantially circular opening and divides the positioning flat plate 221 into two symmetric portions, and the middle plane of the first fixing platform 2221 refers to a middle plane that is perpendicular to the top surface of the first fixing platform 2221, passes through the centre of the circular opening and divides the first fixing platform 2221 into two symmetric portions. The present embodiment has three fixing platforms with the second fixing platform 2222 and third fixing platform 2223 being symmetrically distributed at both sides of the middle plane of the positioning flat plate portion 221. Therefore, the coil supporting stability may be further improved with a relatively simple structure and a low manufacturing cost.

Further, as shown in FIG. 8, the number of the fixing platform may also be two, and the two fixing platforms are a fourth fixing platform 2224 and a fifth fixing platform 2225, respectively. Certainly, in order to enlarge the distribution range of the two fixing platforms, the two fixing platforms may be respectively disposed at two ends of the positioning flat plate portion 221, and are symmetrically distributed at both sides of the middle plane of the positioning flat plate portion 221, as shown in FIG. 8. It should be stated here that the fourth fixing platform 2224 and the fifth fixing platform 2225 are not absolutely symmetric with respect to the middle plane of the positioning flat plate portion 221. Since a second positioning groove 222a is provided on the fifth fixing platform, the both are only substantially symmetric with respect to the middle plane of the positioning flat plate portion 221. Obviously, such embodiment can further simplify the structure and lower the manufacturing cost on basis of ensuring the coil supporting stability.

Figure 9:
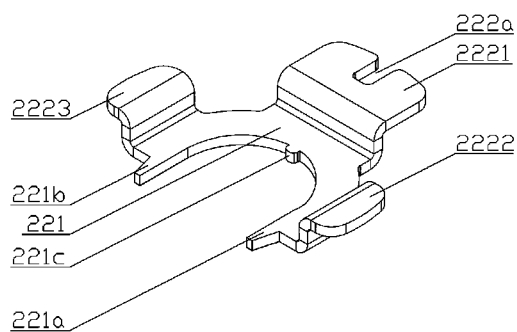
FIG. 9 is a structural schematic view of the fixing frame of the valve body device in a further embodiment of the present invention.
Figure 10:
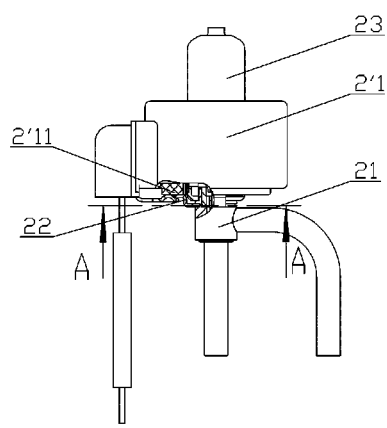
FIG. 10 is a structural schematic view of the electric control valve in a further embodiment of the present invention.
Figure 11:
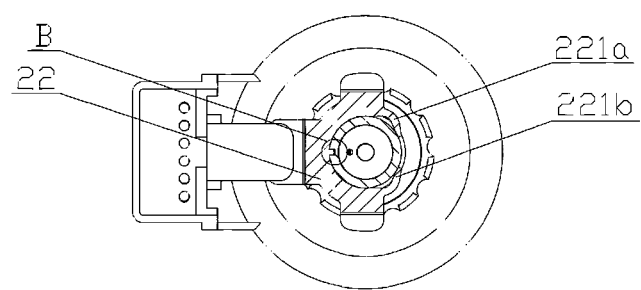
FIG. 11 is a structural schematic view of section A-A in FIG. 10.

Referring to FIGS. 9, 10 and 11, wherein FIG. 9 is a structural schematic view of the fixing frame of the valve body device in a further embodiment of the present invention, FIG. 10 is a structural schematic view of the electric control valve in a further embodiment of the present invention, and FIG. 11 is a structural schematic view of section A-A in FIG. 10.

In any one of the above embodiments that is provided with the fixing platform, connecting forms between the fixing frame 22 and the valve seat 21 may be further designed. Specifically, as shown in FIG. 9, a first connecting portion 221a and a second connecting portion 221b respectively project out of two ends of the positioning flat plate portion 221 along a tangential direction of an opening therebetween. The first connecting portion 221a and the second connecting portion 221b are deformed through dedicated tool equipment and are riveted into the first positioning groove 211, as shown in FIG. 11. Obviously, this connecting form can avoid damage to the fixing frame 22 caused by welding.

Figure 12:
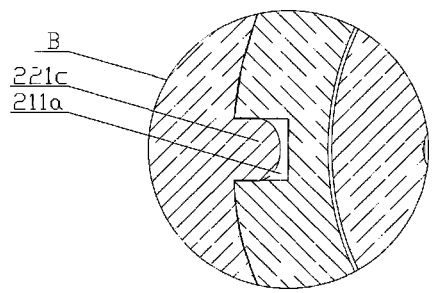
FIG. 12 is a partially enlarged view of portion B in FIG. 11.

Referring to FIG. 12, wherein FIG. 12 is a partially enlarged view of portion B in FIG. 11.

As shown in FIG. 12, in order to further prevent the fixing frame 22 from rotating around the valve seat 21, an inner edge of the positioning flat plate portion 221 may be provided with a projecting portion 221c, and a bottom portion of the first positioning groove 211 may be provided with a recessed portion 211a that is fitted with the projecting portion 221c. Obviously, such embodiment can prevent the fixing frame 22 from rotating around the fixing frame 22 with a relatively simple structure and a low manufacturing cost.

The fifth embodiment of the present invention is a further improvement made on the basis of any one of the embodiments described above.

In the fifth embodiment, the positioning flat plate portion 221 is inserted into the first positioning groove 211, and the fixed connection therebetween can be made through welding. Specifically, the fixed connection between the positioning flat plate portion 221 and the valve seat 21 is made through laser welding or argon welding.

In the prior art, the fixing frame 22 is connected with the valve seat 21 through brazing. Since the brazing temperature is high, the fixing frame 22 per se will be damaged during the welding. When welding the fixing frame 22, the temperature of the laser welding or the argon welding is relatively low as compared with the high temperature brazing. Therefore, the damage to the fixing frame 22 per se by the welding is substantially reduced.

Figure 6:
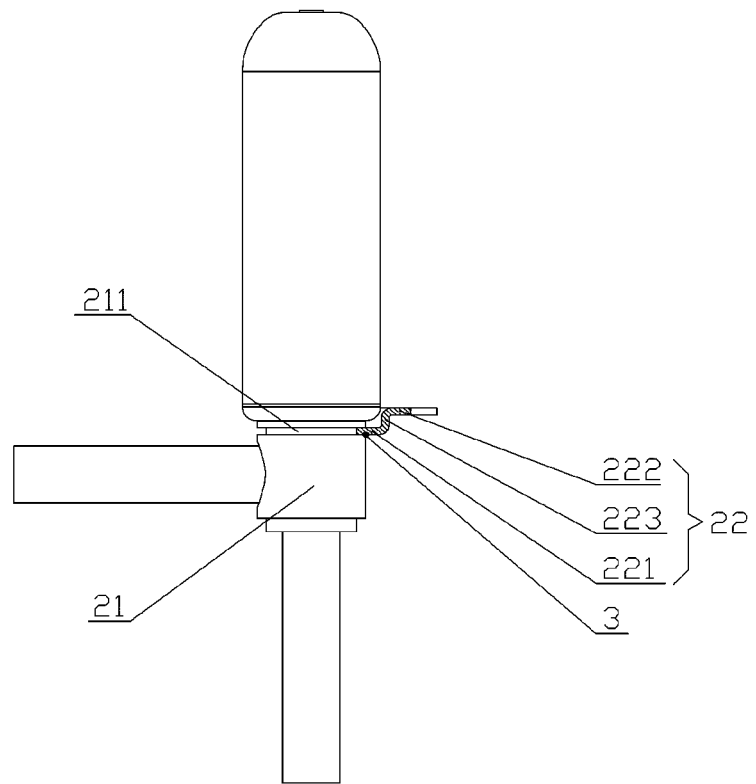
FIG. 6 is a positional schematic view of the welding point between the valve seat and the fixing frame of the valve body device in an embodiment of the present invention.

Referring to FIG. 6, wherein FIG. 6 is a positional schematic view of the welding point between the valve seat and the fixing frame of the valve body device in an embodiment of the present invention.

Specifically, the welding point 3 between the positioning flat plate portion 221 and the valve seat 21 is located at a bottom wall of the positioning flat plate portion 221 and is in contact with the first positioning groove 211. Such arrangement may make the welding become convenient and improve the welding quality.

In addition, the present invention further provides an electrical control valve including the valve body device according to any one of the embodiments described above.

Referring to FIG. 5, in the first embodiment, the electromagnetic coil device of the electric control valve provided by the present invention includes a coil body 2'1, which is provided with a wiring terminal portion 2'12 projecting out of a circumferential side surface thereof. The electromagnetic coil device further includes a snap fitting 2'2, which has a projecting flat plate portion 2'21 and an inserting flat plate portion 2'22 fixedly connected with the projecting flat plate portion 2'21. The inserting flat plate portion 2'22 is pottingly connected with the wiring terminal portion 2'12 through potting material. Resin material may be used as the potting material. The resin material is originally fluid-like, and then gradually solidified through being put for a period of time, thereby the fixed connection of the inserting flat plate portion 2'22 with the wiring terminal portion 2'12 is achieved.

As compared with a screw connection, fixedly connecting the snap fitting 2'2 and the coil body 2'1 together through the potting material allows for a substantial improvement in the reliability of the connection between the both. Furthermore, the use of screw is avoided or the number thereof is reduced, and thus the manufacturing cost is reduced.

As compared with welding, fixedly connecting the snap fitting 2'2 and the coil body 2'1 together through the potting material avoids electrochemical corrosion in a stator case caused by dissimilar metal welding between the snap fitting 2'2 and the stator case of the electromagnetic coil device. Therefore, the life of the electromagnetic coil is prolonged.

Referring to FIG. 5, the second embodiment of the electric control valve provided by the present invention is a further improvement made on the basis of the first embodiment described above.

In the second embodiment, the wiring terminal portion 2'12 is further provided with a third positioning groove 2'12a, into which the inserting flat plate portion 2'22 is pottingly connected through the potting material.

Before the potting, the inserting flat plate portion 2'22 of the snap fitting 2'2 is placed in the third positioning groove 2'12a and mounted. The potting material is then injected into the third positioning groove 2'12a, surrounds the inserting flat plate portion 2'22 under the action of a side wall of the third positioning groove 2'12a, and after the potting material is solidified, the inserting flat plate portion 2'22 is pottingly fixed in the third positioning groove 2'12a. Such fixation way of the inserting flat plate portion is simple and convenient, easy to operate, and allows for a more reliable fixed connection between the inserting flat plate portion 2'22 and the wiring terminal portion 2'12.

An electric control valve and a valve body device thereof provided by the present invention are explained in detail above. Herein, the principle and embodiments of the present invention are illustrated by way of specific examples, and the above illustration of the embodiments is intended only to facilitate understanding the method of the present invention and the core idea thereof. It should be noted that for persons skilled in the art, many improvements and modifications may also be made to the present invention without departing from the principle of the present invention, which improvements and modifications also fall within the scope of protection of the claims of the present invention.

What is claimed is:

1. A valve body device for an electric control valve, comprising a valve seat and a fixing frame connected with the valve seat, wherein the valve seat is provided on its outer wall with a first positioning groove extending circumferentially, and the direction towards which the first positioning groove opens is perpendicular to the axial direction of the valve seat;
the fixing frame is provided with a positioning flat plate portion for cooperating with the first positioning groove, and the positioning flat plate portion is inserted into the first positioning groove and fixedly connected with the valve seat,
the first positioning groove extends over at least half of the circumference, and the positioning flat plate portion has a substantially C shape,
the fixing frame further comprises a fixing flat plate portion connected with the positioning flat plate portion, and the fixing flat plate portion supports an electromagnetic coil device of the electric control valve,
the fixing frame further comprises an arc-shaped connecting portion by which the positioning flat plate portion is connected with the fixing flat plate portion, and
the fixing flat plate portion is provided with a second positioning groove for cooperating with a positioning projecting portion of a snap fitting of the electromagnetic coil device, wherein the second positioning groove comprises at least one recess that extends from an outer edge of the fixing flat plate portion the axis of the second positioning groove is offset from the axis of the valve.

2. The valve body device according to claim 1, wherein, the fixing flat plate portion comprises at least one fixing platform, each of the fixing platforms has a top surface parallel to the top surface of the positioning flat plate portion and located in the same plane, and at least one of the respective fixing platforms is provided with the second positioning groove.

3. The valve body device according to claim 2, wherein, the number of the fixing platform is at least two, and the fixing platforms distribute within a range larger than 180° in a plane perpendicular to an axis of the valve seat.

4. The valve body device according to claim 3, wherein: the number of the fixing platform is three, the three fixing platforms are a first fixing platform, a second fixing platform and a third fixing platform, respectively;
a middle plane of the first fixing platform is coplanar with a middle plane of the positioning flat plate portion, and the second positioning groove is provided at the first fixing platform;
the second fixing platform and the third fixing platform are respectively disposed at two ends of the positioning flat plate portion and are symmetrically distributed at both sides of the middle plane of the positioning flat plate portion.

5. The valve body device according to claim 3, wherein: the number of the fixing platform is two, the two fixing platforms are a fourth fixing platform and a fifth fixing platform, respectively; the fourth fixing platform and the fifth fixing platform are respectively disposed at two ends of the positioning flat plate portion and are symmetrically distributed at both sides of a middle plane of the positioning flat plate portion.

6. The valve body device according to claim 2, wherein, a first connecting portion and a second connecting portion respectively project out of two ends of the positioning flat plate portion along directions of tangent at an opening thereof and are riveted into the first positioning groove.

7. The valve body device according to claim 6, wherein, an inner edge of the positioning flat plate portion is provided with a projecting portion, and a bottom portion of the first positioning groove is provided with a recessed portion that is fitted with the projecting portion.

8. The valve body device according to claim 1, wherein, a fixed connection between the positioning flat plate portion and the valve seat is made through laser welding or argon welding.

9. The valve body device according to claim 8, wherein, welding points between the positioning flat plate portion and the valve seat are located at a bottom wall of the positioning flat plate portion.

10. An electric control valve, wherein it comprises a valve body device according to claim 1.

11. The electric control valve according to claim 10, wherein,
an electromagnetic coil device of the electric control valve comprises a coil body, the coil body is provided with a wiring terminal portion projecting out of a circumferential side surface thereof; and
the electromagnetic coil device further comprises a snap fitting, the snap fitting has an inserting flat plate portion which is pottingly connected with the wiring terminal portion through potting material.

12. The electric control valve according to claim 11, wherein, the wiring terminal portion is further provided with a third positioning groove into which the inserting flat plate portion is pottingly connected through the potting material.

* * * * *